United States Patent Office 3,350,259
Patented Oct. 31, 1967

3,350,259
PURIFICATION OF AQUEOUS REFUSE LIQUIDS CONTAINING THE ORTHO-HYDROXYPHENOL MOIETY
Ivan Herrick, Whitman County, Mark F. Adams, Pullman, and Ethan Max Huffaker, Whitman County, Wash., assignors to Northwest Magnesite Company, a corporation of Washington
No Drawing. Filed Dec. 21, 1964, Ser. No. 420,117
12 Claims. (Cl. 162—16)

ABSTRACT OF THE DISCLOSURE

Selectively and substantially quantitatively removing water-soluble compounds from aqueous streams, which compounds include the ortho-hydroxyphenol moiety, by the addition of MgO-containing compounds to aqueous streams containing such moiety.

---

Contemporary society is placing increasing demands on natural fresh water resources. Not only is industry demanding an increasing share of the available fresh water supply, but the rapidly expanding population is using more water in the home. Due, in large part, to these demands, both local and national government are becoming more strict with industry as to its reintroduction of aqueous wastes into fresh water streams and the like. Many regulations require that aqueous waste be substantially free of solid and dissolved adulterating constituents. One particularly obnoxious class of adulterants, which finds its way into aqueous industrial waste streams, is the ortho-hydroxyphenols; for example, of the type present in the waste streams of paper pulping processes.

Accordingly, it is an object of this invention to provide a process for the treatment of aqueous streams to remove dissolved ortho-hydroxyphenols. It is a further object of the invention to provide a process for the treatment of the aqueous waste streams of paper pulping processes to remove dissolved ortho-hydroxyphenols.

In one aspect, the process of this invention uses a special type of magnesia. In view of this, it is thought a definition of terms is essential for a better understanding of this invention.

(1) *Magnesite or magnesia.*—In the refractories art, these terms are used interchangeably. It is, of course, a misnomer to apply the term "magnesite" to the oxide product, magnesia. In this specification, "magnesia" means the oxide of magnesium, MgO.

(2) *Dead-burned magnesite or magnesia.*—To the refractories art, these terms are used interchangeably to describe the dense, highly crystalline, periclase product of good stability, which is used to fabricate refractory brick and the like.

(3) *Calcined and calcination.*—In the refractories art, these terms are normally used in relation to a so-called "caustic" calcining process. For example, calcined magnesia, to the refractories art, describes a material which has been heated to a sufficient temperature to drive off all free and substantially all chemically combined water and $CO_2$; for example, 1500 to 2200° F. It is a fairly reactive material and, in any event, considerably more reactive than the dead burned product.

(4) *Calcined active magnesia.*—This is terminology used in this application to describe a product which has been heated to a temperature much lower than that required for the manufacture of "caustic" calcined magnesia. This calcined active magnesia has many unique properties, which are discussed hereafter, and which are not found in "caustic" calcined magnesia or in dead burned magnesia.

(5) *Very finely divided.*—When this language is used to describe the calcined active magnesia of the process of this application, it means substantially all particles are less than 44 microns (this is —325 mesh Tyler) and substantially free of submicron-size particles. By "substantially" free, it is meant to infer that about 90% of the material is greater than 1 and less than 44 microns in size.

(6) *Granular to fines.*—When this language is used, it means substantially all material passes a 20-mesh Tyler screen, and about 40 to 60% is held on a 325-mesh screen.

(7) *Low density.*—When this language is used to describe the calcined active magnesia used in the practice of the present invention, it infers a density on the order of about 6.5 p.c.f. (pounds per cubic foot) to about 12.5 p.c.f. In comparison, the dead burned magnesite or magnesia, mentioned above, has a density normally over 180 p.c.f.

(8) *High purity magnesia.*—This terminology, when used to describe the calcined active magnesia used in the practice of this invention, means at least about 97% of MgO, by weight on an oxide basis, and usually over 98% MgO, on the same basis.

(9) *High reactive MgO-content material.*—In this specification, this language means at least about 90% MgO. This MgO is capable of reacting as is described below. The remainder is mineral acid salts; for example, salts of sulfuric, nitric, and hydrochloric acid and the like, alkaline metal and alkaline earth compounds and trace impurities.

(10) *Inert materials.*—In this specification, inert materials means materials which are not soluble in water and/or which do not react in the system to change the pH from the desired range discussed below.

Briefly, according to one aspect of this invention, our novel process consists essentially of passing a quantity of an aqueous industrial waste stream including dissolved ortho-hydroxyphenols, in intimate association with actively-calcined magnesia, or caustic calcined high purity magnesia, or high MgO-content material of the types above defined. The magnesia or high MgO-content material may be very finely divided or granular to fines. The system must be at a temperature of at least 35° C.

The prior art has understood and recognized that certain forms of inorganic oxides and salts could be used in extracting various organic constituents from certain types of chemical streams or compositions containing these constituents. For example, the United States patent to Parkes, No. 1,821,815, discloses extracting catechols from ammonia liquors; for example, of the type produced from the destructive distillation of coal from the volatile products of distilation and subjected only to a relatively low temperature as in the case, for example, when vertical gas retorts are employed. The United States patent to Wittek, No. 2,259,598, discloses separating phenols and bases from phenol-containing hydrocarbon or organic product streams, especially tar oils and the like. An apparent subsidiary aspect of the Wittek Process is the separation of magnesium oxide from burned dolomite or the like.

The United States patent of Thomsen, No. 1,870,881, discloses a process for treatment of "white water" (an aqueous suspension of fine wood pulp constituents) produced in pulp and paper making, with a soluble salt of a metal having an insoluble hydroxide. The primary thrust of the Thomsen patent apparently is the recovery of very fine pulp constituents, which are otherwise lost with process waste effluent. Among the soluble salts mentioned are magnesium salts.

The present invention is perhaps most closely related to the art in which the Thomsen patent is classified, since it relates to treating aqueous streams as distinguished from the hydrocarbon or organic streams of the other prior art patents discussed above.

Example I

A quantity of an aqueous waste stream from a sulfite or sulfate paper-pulping process is passed in intimate association with magnesia. The magnesia is present in a quantity sufficient to obtain a pH in the range 8 to 12, preferably 9 to 11. The solution is heated to a temperature of at least about 35 and preferably at least about 70° C. The upper temperature is not particularly important except from an economic standpoint. However, 100° C. is the maximum temperature we recommend from a practical standpoint. Contained, dissolved, ortho-hydroxyphenol constituents (for example, tannic acid) are substantially quantitatively removed from the stream.

Example II

The process of Example I in which caustic calcined, high purity magnesia or high MgO-content material is used.

Example III

The process of either Example I or Example II in which the magnesia process ingredient is in combination with up to about 90%, by weight, of inert materials. As a practical matter, the quantities of inert material is an economic, not an operational process parameter since it does not affect the desired reaction. Of course, the larger the quantity of inert material, the larger and less economic the material handling problems become.

Example IV

An aqueous waste stream including one or more dissolved water-soluble ortho-hydroxyphenols selected from the group consisting essentially:

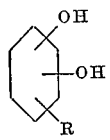

wherein R is selected from the group consisting essentially of hydrogen, hydroxyl, carboxyl, amino, aldehyde (aldo), alkyl, aromatic, ketone, ester, and ether, to form a water-soluble compound, and in which the OH radicals are attached to adjacent carbon atoms on the benzene ring, is passed in intimate association with a magnesia material, as defined in Examples I, II, and III. The selected phenols, above noted, are substantially quantitatively removed from the stream.

The calcined active material, as herein defined, is made according to the process disclosed and claimed in the copending application Ser. No. 419,708 (now U.S. Patent No. 3,320,029, issued May 16, 1967), by Mark F. Adams, entitled, "Low Density, High Purity Magnesia," filed of even date herewith. This magnesia is characterized by a density on the order of 6.5 to 12.5 p.c.f. This low density, and the very finely divided character of the product, gives rise to a "fluffy" appearance, which makes this material an excellent agent which is selective for ortho-hydroxyphenols. It is the preferred one of this invention. It provides results superior to any of the others mentioned. The material is not easily compressed because of its fluffy character.

Example V

A preferred embodiment of the practice of this invention and the best mode now known for the practice thereof is as follows: A quantity of the aqueous waste stream from a sulfate pulping process containing 111 grams of ortho-hydroxybenzene was passed in intimate association with calcined active magnesia, as defined above. There was approximately 160 grams of the magnesia. This represented 4 moles of the magnesia per mole of the ortho-hydroxybenzene.

In actual testing, it has been established that the caustic calcined and calcined active magnesia used according to the practice of this invention are not selective for monohydroxyphenols. They are not selective for para-hydroxyphenols.

All chemical analyses of inorganic materials are on the basis of an oxide analysis in conformity with the practice of reporting the chemical analysis of magnesia materials.

Specific examples of ortho-hydroxyphenols, which can be selectively removed from aqueous solution by the practice of this invention, are as follows:

o-dihydroxybenzene
rutin
lycorine
1,2 dihydroxynaphthalene
3,4 dihydroxybenzoic acid
o-hydroxyaniline
tannic acid
alizarin
quercetin Stated another way, any water-soluble compound, which has the ortho-hydroxy linkage on a benzene nucleus, can be removed from a water solution thereof by the practice of this invention. Such compounds include those in which the benzene ring is a part of a cyclic or heterocyclic ring system (lycorine, for example), those in which the benzene ring is a substituent (rutin, for example), and those compounds in which the ortho-hydroxybenzene nucleus includes lower alkyl ($C_1$ to $C_5$, for example) substituents. The compounds cannot include strongly (1) electropositive, or (2) electronegative ions such as the (1) alkaline metals, and (2) halides, because they (1) effect or affect the ortho-position of the hydroxide radicals and (2) effect or affect the calcined active magnesia to block the desired reaction.

In general, it may be said that the soluble compounds cannot include inorganic ions, nor radicals (such as $NO_3$ or $SO_4$), which react or affect or effect the calcined active magnesia to render it inactive or not capable of its intended function, i.e., selective removal of the compound from water solution; or which ions or radicals change or modify the ortho relation of the hydroxy radicals on the benzene nucleus.

In the foregoing discussion, we have mentioned "high purity magnesia" or "high MgO-content" compounds as operable materials, and also stated that there can be used materials in association with very large quantities of so-called "inert ingredients." Thus, the material we use to treat the ortho-hydroxyphenol-containing aqueous solution can, in one aspect, be considered a two-component system; namely, (1) a reactive magnesia which can include up to 10%, by weight, of reactive impurities (preferably less than 3%, by weight), and (2) inert ingredients. Example III states that the inert ingredients can amount to up to 90% of the selected magnesia-process-ingredient. Specific examples of the reactive impurities which must be kept to a minimum are CaO, Na(OH), NaO, etc. These materials affect the pH undesirably. Such materials as NaCl, $MgCl_2$, $Mg(OH)_2$, $CaCO_2$ are considered inert since they do not adversely change the pH.

In one preferred example of operation we mention using 4 moles of MgO (on an oxide basis) per mole of the ortho-hydroxyphenol in question. Routine experiment has shown the molar ratio is variable depending on the phenol being removed. Thus, broadly according to this invention, one uses at least, and preferably more, MgO containing material than that necessary to (1) bring the pH of the system within the range 8 to 12, and (2) quantitatively react with and remove the phenols in question from the solution being treated.

Still further, mere "contact" between the magnesia and the ortho-hydroxyphenol-containing solution is not enough. There must be heat and, also, intimate physical association as, for example, brought about by rigorous agitation and/or boiling.

Having thus described the invention in detail and with sufficient particularity as to enable those skilled in the art to practice it, what is desired to have protected by Letters Patent is set forth in the following claims:

We claim:

1. That process of removing water-soluble ortho-hydroxyphenols from solution in aqueous solutions containing them, consisting essentially of passing said aqueous solution in intimate physical association with material selected from the group consisting essentially of:
   (1) calcined active magnesia,
   (2) caustic calcined magnesia,
   (3) high reactive MgO-content material,
   (4) mixtures of material selected from the group consisting essentially of (1), (2), and (3), and
   (5) mixtures of material selected from the group consisting essentially of (1), (2), and (3) with, by weight, up to 10% of reactive impurities and up to 90% of inert ingredients;
there being sufficient MgO to bring the pH of the solution to the range 8 to 12, maintaining the temperature of the solution above at least about 35° C., and recovering an aqueous stream substantially free of said ortho-hydroxyphenols.

2. The process of claim 1 in which said calcined active magnesia consists essentially of material which is substantially all less than 44 microns and substantially free of submicron-size particles, said magnesia having a density on the order of 6.5 p.c.f. to 12.5 p.c.f., said magnesia having an MgO content, by weight on an oxide basis, of at least about 97%, said magnesia having been calcined at a temperature in the range 450 to less than 700° C. for a time period in the range ten minutes to one hour.

3. The process of claim 2 in which said magnesia has been calcined in the range 500 to 600° C.

4. That process of removing water-soluble ortho-hydroxyphenols from solution in aqueous solutions containing them, consisting essentially of passing said aqueous solution in intimate physical association with materials selected from the group consisting essentially of:
   (1) calcined active magnesia,
   (2) caustic calcined magnesia,
   (3) high reactive MgO-content material,
   (4) mixtures of material selected from the group consisting essentially of (1), (2), and (3), and
   (5) mixtures of material selected from the group consisting essentially of (1), (2), and (3) with, by weight, up to 10% of reactive impurities and up to 90% of inert ingredients;
there being sufficient of said material to maintain a basic pH sufficient to obtain quantitative removal of said ortho-hydroxyphenols from said solution upon intimate association with said material, the solution being at a temperature of at least 35° C., and recovering an aqueous stream substantially free of said ortho-hydroxyphenols.

5. The process of removing tannic acid from the aqueous waste effluent of paper pulping processes containing it, consisting essentially of passing said effluent in intimate physical association with material selected from the group consisting essentially of:
   (1) calcined active magnesia,
   (2) caustic calcined magnesia,
   (3) high reactive MgO-content material,
   (4) mixtures of material selected from the group consisting essentially of (1), (2), and (3), and
   (5) mixtures of material selected from the group consisting essentially of (1), (2), and (3) with, by weight, up to 10% of reactive impurities and up to 90% of inert ingredients;
there being sufficient MgO to bring the pH of the solution to the range 8 to 12, maintaining the temperature of the solution above at least about 35° C., and recovering an aqueous stream substantially free of said ortho-hydroxyphenols.

6. That process of removing dissolved ortho-hydroxyphenols selected from the group consisting essentially of:

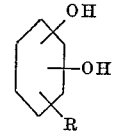

wherein R is selected from the group consisting essentially of hydrogen, hydroxyl, carboxyl, amino, aldehyde, alkyl, aromatic, ketone, ester, and ether, to form a water-soluble compound, and in which the OH radicals are attached to adjacent carbon atoms; from aqueous streams containing them, consisting essentially of passing said aqueous stream in intimate physical association with material selected from the group consisting essentially of:
   (1) calcined active magnesia,
   (2) caustic calcined magnesia,
   (3) high reactive MgO-content material,
   (4) mixtures of material selected from the group consisting essentially of (1), (2), and (3), and
   (5) mixtures of material selected from the group consisting essentially of (1), (2), and (3) with, by weight, up to 10% of reactive impurities and up to 90% of inert ingredients;
there being sufficient MgO to bring the pH of the solution to the range 8 to 12, maintaining the temperature of the solution above at least about 35° C., and recovering an aqueous stream substantially free of said ortho-hydroxyphenols.

7. That process of removing ortho-hydroxybenzene from an aqueous solution containing it, consisting essentially of passing said solution in intimate physical association with calcined active magnesia, there being at least about 4 moles of the magnesia per mole of the ortho-hydroxybenzene, maintaining the temperature of said solution above at least about 35° C., and recovering an aqueous stream substantially free of said ortho-hydroxybenzene.

8. That process of removing dissolved ortho-hydroxyphenols selected from the group consisting essentially of:

o-dihydroxybenzene
rutin
lycorine
1,2 dihydroxynaphthalene
3,4 dihydroxybenzoic acid
o-hydroxyaniline
alizarin
quercetin from aqueous streams containing them, consisting essentially of passing said aqueous stream in intimate physical association with the material selected from the group consisting essentially of:
   (1) calcined active magnesia,
   (2) caustic calcined magnesia,
   (3) high reactive MgO-content material,
   (4) mixtures of material selected from the group consisting essentially of (1), (2), and (3), and
   (5) mixtures of material selected from the group consisting essentially of (1), (2), and (3) with, by weight, up to 10% of reactive impurities and up to 90% of inert ingredients;
there being sufficient MgO to bring the pH of the solution to the range 8 to 12, maintaining the temperature of the solution above at least about 35° C., and recovering an aqueous stream substantially free of said ortho-hydroxyphenols.

9. That process for removing a water-soluble compound from an aqueous solution containing it, which compound contains an ortho-hydroxy linkage on a benzene nucleus, consisting essentially of passing said solution in intimate physical association with material selected from the group consisting essentially of:
(1) calcined active magnesia,
(2) caustic calcined magnesia,
(3) high reactive MgO-content material,
(4) mixtures of material selected from the group consisting essentially of (1), (2), and (3), and
(5) mixtures of material selected from the group consisting essentially of (1), (2), and (3) with, by weight, up to 10% of reactive impurities and up to 90% of inert ingredients;

there being sufficient MgO to bring the pH of the solution to the range 8 to 12, maintaining the temperature of the solution above at least about 35° C., and recovering an aqueous stream substantially free of said water-soluble compound.

10. That process of removing water-soluble ortho-hydroxyphenols from solution in aqueous solutions containing them, consisting essentially of passing said aqueous solution in intimate physical association with material selected from the group consisting essentially of:
(1) calcined active magnesia,
(2) caustic calcined magnesia,
(3) high reactive MgO-content material,
(4) mixtures of material selected from the group consisting essentially of (1), (2), and (3), and
(5) mixtures of material selected from the group consisting essentially of (1), (2), and (3) with, by weight, up to 10% of reactive impurities and up to 90% of inert ingredients;

there being sufficient MgO to bring the pH of the solution to the range 8 to 12, maintaining the temperature of the solution in the range about 70 to 100° C., and recovering an aqueous stream substantially free of said ortho-hydroxyphenols.

11. That process of removing water-soluble ortho-hydroxyphenols from solution in aqueous solutions containing them, consisting essentially of passing said aqueous solution in intimate physical association with material selected from the group consisting essentially of:
(1) calcined active magnesia,
(2) caustic calcined magnesia,
(3) high reactive MgO-content material,
(4) mixtures of material selected from the group consisting essentially of (1), (2), and (3), and
(5) mixtures of material selected from the group consisting essentially of (1), (2), and (3) with, by weight, up to 10% of reactive impurities and up to 90% of inert ingredients;

there being sufficient MgO to bring the pH of the solution to the range 9 to 11, maintaining the temperature of the solution in the range about 70 to 100° C., and recovering an aqueous stream substantially free of said ortho-hydroxyphenols.

12. That process of removing water-soluble compounds from aqueous streams in which they are dissolved, which compounds are selected from the group consisting essentially of:

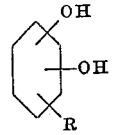

wherein R is selected from the group consisting essentially of hydrogen, hydroxyl, carboxyl, amino, aldehyde, alkyl, aromatic, ketone, ester, and ether, to form a water-soluble compound, and in which the OH radicals are attached to adjacent carbon atoms;

consisting essentially of passing said aqueous stream in intimate physical association with a magnesia material, there being sufficient magnesia-process-ingredient to substantially quantitatively remove said compounds from said stream, the stream and magnesia-process-ingredient combination being at a temperature of at least 35° C. and having a basic pH.

References Cited

UNITED STATES PATENTS 2,385,955   10/1945   Tomlinson   162—36
2,716,589   8/1955   Byrns   162—38 X S. LEON BASHORE, *Primary Examiner.*